United States Patent [19]
Daniel

[11] Patent Number: 5,847,354
[45] Date of Patent: Dec. 8, 1998

[54] ARC TRANSFER CIRCUIT

[75] Inventor: Joseph Allen Daniel, Mentor, Ohio

[73] Assignee: The Lincoln Electric Company, Cleveland, Ohio

[21] Appl. No.: 819,968

[22] Filed: Mar. 18, 1997

[51] Int. Cl.⁶ .................................................. B23K 10/00
[52] U.S. Cl. ............................... 219/121.54; 219/121.39; 219/121.59; 219/121.57
[58] Field of Search ..................... 219/121.54, 121.57, 219/121.55, 121.56, 121.39, 121.59, 121.52

[56] References Cited

U.S. PATENT DOCUMENTS

| | | | |
|---|---|---|---|
| 5,506,384 | 4/1996 | Yamaguchi | 219/121.57 |
| 5,530,220 | 6/1996 | Tatham | 219/121.57 |
| 5,630,952 | 5/1997 | Karino et al. | 219/121.57 |

*Primary Examiner*—Mark H. Paschall
*Attorney, Agent, or Firm*—Vickers, Daniels & Young

[57] ABSTRACT

A circuit for providing D.C. current from a power source having a current regulating input to a plasma system including an electrode and a nozzle with a plasma arc opening exposing the electrode to a juxtapositioned workpiece, which circuit has a first circuit branch for creating a pilot arc across the electrode and nozzle, a second circuit branch for creating an operative plasma arc across the electrode and the workpiece, a current sensor in the second circuit branch for sensing the workpiece current in the second circuit branch, a switch for opening the first circuit branch when the sensed workpiece current exceeds a preselected current to transfer the pilot arc to the operative plasma arc, a system for regulating the current in the first circuit branch until the arc transfer and a circuit for increasing the pilot current supplied from said power source to first circuit branch when sensed workpiece current exceeds a low threshold value.

27 Claims, 6 Drawing Sheets

ARC TRANSFER CIRCUIT

The present invention relates to a plasma arc system of the type including an electrode and nozzle with a plasma arc opening exposing the electrode to a juxtapositioned workpiece and more particularly, to an arc transfer circuit for such a plasma system.

INCORPORATION BY REFERENCE

The plasma arc systems to which the invention is directed to include an electrode and a nozzle with a plasma arc opening exposing the electrode to a juxtapositioned workpiece and are driven by a DC current from an appropriate power source. A first branch of the circuit connecting the power source to the plasma torch is used to create a pilot arc between the electrode and nozzle. As the workpiece is moved closer to the nozzle, workpiece current starts to flow through the ionized layer between the electrode and workpiece. At that time, the first branch of the connecting circuit is opened or disconnected and the power source provides DC current between the electrode and workpiece to transfer the pilot arc to an operating arc for cutting or other metal processing by the plasma system. Various circuits have been disclosed for connecting the power source to the plasma torch such as the circuit disclosed in Tatham U.S. Pat. No. 5,530,220, which is incorporated by reference herein. This prior art patent illustrates the use of a resistor in the pilot arc branch of the connecting circuit for creating a high voltage between the workpiece and the nozzle during the pilot arc mode of operation. The size of this resistor determines the normal voltage between the workpiece to nozzle which voltage is indicative of the standoff distance across which the arc can be transferred when shifted from the pilot mode of operation to the operating or cutting mode of operation. Various circuit arrangements have been suggested for increasing this available voltage to increase the standoff distance, such as the use of an inductor in the lead to the electrode, which inductor stores current and creates an inductive discharge which produces a high voltage that is used in increasing the standoff distance. This concept to increase the voltage for arc transfer is illustrated in the patent incorporated by reference herein as a representative teaching of the background to which the present invention is directed. This patent shows a connecting circuit that includes various circuitry for sensing current, controlling current and for shifting between the pilot arc mode and the cutting mode in a plasma system.

BACKGROUND OF THE INVENTION

The present invention is useful for a wide variety of plasma systems and for simplicity will be discussed in connection with a system wherein the voltage from the workpiece to the electrode is controlled by a resistor in the pilot arc circuit branch; however, it must be appreciated that the invention has much broader applications and may be used in essentially all plasma arc systems of the type wherein the workpiece current is sensed and the circuit connecting the power source and the torch is shifted between a pilot arc mode of operation to a cutting mode of operation. It is to appreciated that the standoff distance which is increased by increasing the voltage available at a transfer from the pilot mode to the cutting mode should be as high as practical within applicable regulations; however, the present invention is directed to another aspect of the plasma system. Most plasma systems maintain a relatively high pilot arc current so that the highest possible standoff transfer distance can be created for the voltage available for the arc transfer process. Consequently, high pilot arc currents are generally used, which high currents substantially decrease the life of the nozzle. If the pilot arc current is decreased, the standoff distance is correspondly decreased which is a distinct disadvantage in the operation of a plasma torch, especially for automatic operations such as robotic cutting installation.

A typical gas plasma torch includes a circuit between the power supply and the torch with a pilot arc branch that is maintained at a regulated current of approximately 20–30 amperes. It is known that in order to achieve a greater transfer distance, the current and workpiece to nozzle voltage of the pilot circuit could be increased; however, increasing the pilot arc current to a level allowing a greater transfer distance will cause substantial wear and decrease the life of the elements comprising the plasma torch.

Consequently, there is a need for a circuit to connect the DC power source to a plasma torch, which circuit will increase the standoff distance or transfer distance without the disadvantages resulting from a high pilot arc current. The present invention is directed toward a circuit for connecting a DC current power source to a plasma system which overcomes these disadvantages.

THE INVENTION

A plasma system is driven by a DC current which may be provided by a pulsating power supply such as an inverter or other appropriate DC power sources. The circuitry connecting the power source to the plasma system, or torch, normally includes a first circuit branch for creating a pilot arc across the electrode and nozzle and a second circuit branch for creating an operating plasma arc across the electrode and workpiece. A current sensor in the second circuit branch senses the actual workpiece current in the second branch so that a switch means, responsive to the current to the workpiece, can be used to open the pilot arc branch when the workpiece current exceeds a preselected measured current. In this manner, as the workpiece is moved closer to the nozzle, current starts to flow in the second branch of the circuit. This current flow is allowed by the ionized gases of the pilot arc and is indicative of the closeness between the workpiece and plasma torch. When this current flow indicates that the workpiece is at a preselected standoff distance, the pilot arc branch or circuit is opened and the power source provides current to the workpiece. The pilot arc is transferred to the workpiece for cutting or other heat related processing. Such connecting circuits regulate the current in the pilot arc branch to a preselected level normally in the range of 10–30 amperes. This pilot arc current shifts to zero when the pilot arc branch of the connecting circuit is opened. To regulate the pilot arc current to the selected set value, a standard current regulating arrangement is employed. A signal representative of the actual current supplied from the power source to the pilot arc circuit or branch is compared to a second signal representative of the desired pilot arc current. This comparison of the desired or set pilot arc current and the actual pilot arc current is used to control the regulating input of the power source to regulate the actual pilot arc current to the desired or set pilot arc current. In this standard current regulating arrangement, the present invention provides an improvement which includes means for creating a trip signal when the sensed workpiece current exceeds a low level threshold current substantially less than the workpiece current needed for a reliable transfer of the pilot arc. The invention employs means for increasing the level of the signal indicative of a desired pilot arc current to a level above the previously desired or set level to correspondingly increase the actual pilot arc current supplied from the power source to the pilot arc branch. In this manner, when there is a slight amount of workpiece current, the desired value for the pilot arc current is increased rapidly. This increased desired current causes a corresponding increase in the current flowing to the workpiece which accelerates or advances the transfer of the pilot arc to the operating arc at the workpiece. By employing the present invention, a low level pilot arc current is maintained until there is an indication that a workpiece is approaching the nozzle. At that instance, the set pilot current is increased to cause a corresponding increase in the output of the power source to accelerate the arc transfer and, thus, substantially increase the standoff distance.

In accordance with an aspect of the invention, the set level of the pilot current is increased by a circuit for generating a time base signal with an increasing level and having a preselected profile so that the preselected increase is added to the set current signal to cause a corresponding increase of the actual current supplied by the power source to the pilot arc branch of the connecting circuit. In practice, the preferred selected profile is a ramp which is initiated upon a detection of the work current reaching a preselected low level threshold, such as 20–80 mA. In this arrangement, when the low level threshold current is reached by the workpiece current, a trip signal is created which starts or initiates a ramp generator having an output voltage that is added to the voltage which represents the set pilot current. In this manner, the pilot current is ramped upwardly until the workpiece current reaches the preselected standoff value which must exceed about 150 mA, whereas normal practice uses 2–3 amperes. When the workpiece current reaches the set value for arc transfer, the arc transfer is accomplished and the ramp generator is reset awaiting the next pilot arc mode of operation.

The wave shaped circuit can have any number of selected profiles, such as a ramp, straight line ramp, stepped ramp, concave curve, convex curve, a time constant curve or a stepped function, without departing from the intended spirit and scope of the present invention. Indeed, a detection of the low level threshold current could immediately shift the desired pilot arc current from a set value of 15 amperes to a high value of 25 amperes. In all of these situations, the pilot arc current is maintained low until the workpiece comes close. Thereafter, the signal representing the desired pilot arc current used for the current regulation of the power source is increased to increase correspondingly the current at the workpiece and, thus, control the standoff distance at a high pilot current level instead of at the low level. This invention increases the life of the torch and increases the standoff distance from the pilot arc set value.

It has been found that the preselected workpiece current at which the arc is transferred must be greater than about 150 mA; therefore, the low level threshold current is substantially less than 100 mA. In practice, the low level threshold current which appears to signal an impending arc transfer is in the range of 20–80 mA. If the low level threshold current is reached and the desired current of the pilot arc branch is increased without detection of the preset current needed for arc transfer, the present invention resets the wave shaped circuit to shift the current regulator of the power source back to the low level set pilot current. It has been found that in some instances, there may be an arc transfer before the pilot arc current is increased by the present invention. In other instances, the present invention increases the desired pilot arc current above the set value without resulting in an arc transfer. In this instance, the invention merely resets the wave shape circuit awaiting a new indication of an impending arc transfer.

It is the primary object of the present invention to provide a circuit and method for connecting the DC current power source to a plasma system, which circuit and system has an increased transfer distance or standoff than normally associated with the set current of the pilot arc branch, thus, increasing performance and reducing the wear of the plasma torch.

Another object of the present invention is the provision of a circuit and method, as defined above, which circuit and method has a transfer distance associated with a higher pilot current than the normal set pilot current being used in the circuit or method.

In accordance with still a further object of the present invention, the circuit and method, as defined above, which circuit and method reduce the energy consumed during the pilot arc mode of operation of the plasma system.

Yet another object of the present invention is the provision of a circuit and method, as defined above, which circuit and method can effect the arc transfer at a value in the general range of 160 mA to 500 mA whereas prior systems usually require transfer currents in the range of 2–3 amps.

These and other objects and advantages will become apparent from the following description taken together with the accompanied drawings.

PREFERRED EMBODIMENT

Figure 1:
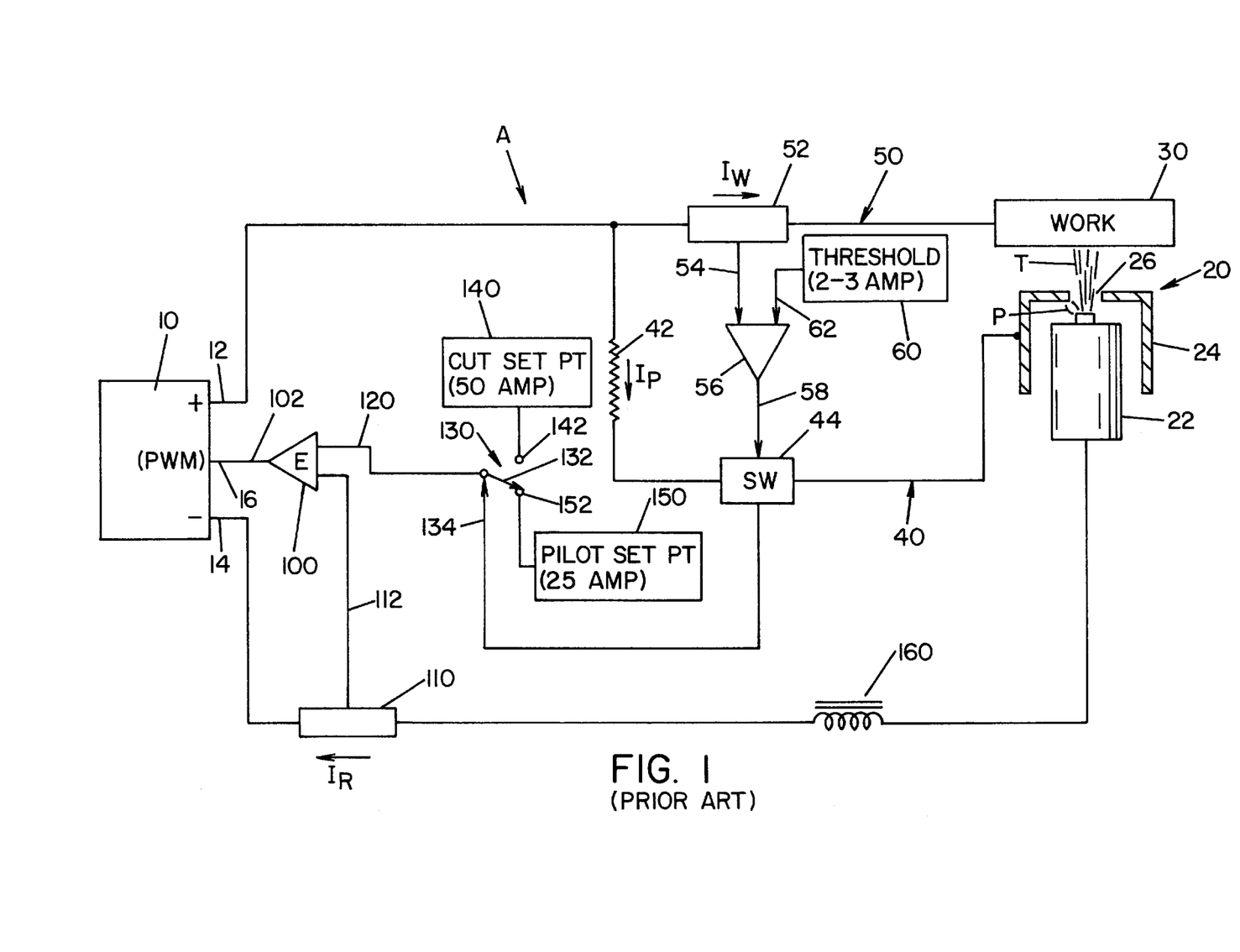
FIG. 1 is a schematic diagram of a prior art circuit for connecting a power source to a plasma system wherein the arc transfer is accomplished at 2–3 amperes and the pilot arc is set at 25 amperes.

Referring now to the drawings wherein the showings are for the purpose of illustrating the preferred embodiment of the invention and not for the purpose of limiting same, FIG. 1 shows a prior art circuit A for connecting DC current power supply 10 with output terminals 12, 14 and a current regulating input 16 to a plasma system or torch 20. Power supply or source 10 provides a DC current at a level determined by the voltage on the current regulating input 16 monitored by a pulse width modulator (PWM) in accordance with standard practice. Voltage on input line 16 controls the current supplied by source 10 in accordance with standard practice. Power source or supply 10 may be a pulsating or steady state device such as an inverter or SCR controlled three phrase rectifier. For the purposes of understanding the present invention, steady state DC current is provided from terminals 12, 14; however, circuit A and the preferred embodiment of the present invention will operate equally well with a pulsating DC power supply. Plasma torch or system 20 includes electrode 22 and nozzle 24 having a plasma arc opening exposing the electrode to a workpiece 30 juxtapositioned to torch 20. In accordance with standard practice, a pilot arc P is first created between electrode 22 and nozzle 24. After a preselected event, which is normally controlled by the workpiece current, pilot arc P is transferred to an operating or transferred arc T schematically represented in FIG. 1. To create the pilot arc, a current $I_p$ is directed through a first circuit branch 40 shown as including a resistor 42 and a solid state switch 44, such as a IGBT or other similar switching device. Resistor 42 is often used in a plasma circuit for creating the voltage between the workpiece 30 and nozzle 24. The resistance of resistor 42 and the pilot arc current $I_p$ determines the voltage available between the workpiece and the nozzle. The voltage across resistor 42 is important in creating the standoff or transfer distance for torch 20. The use of a resistor is illustrative in nature, since the invention is not predicated upon the actual voltage, which voltage can be controlled by various circuits. To discuss the invention, the resistance of resistor 42 may be assumed to be 5.0 ohmns to give a voltage of approximately 125 volts at 25 amperes of pilot arc current $I_p$.

In the prior art, the second circuit branch 50 is used to direct current from workpiece 30 to electrode 22 as the pilot arc P ionizes the gap between the electrode and workpiece. To measure the workpiece current flow $I_w$, there is provided a current sensor 52. The output of device 52 is a voltage on line 54, which voltage is representative of the magnitude of workpiece current $I_w$. The voltage on output line 54 is directed to one input of comparator 56 having a logic toggle output 58 which output toggles to a logic 1 when the voltage in output 54 reaches a voltage matching the preselected current set by threshold circuit 60 having a voltage on output line 62. When the voltage on line 54 exceeds the voltage on line 62, a logic 1 appears on toggle output 58 to open switch 54 in pilot arc circuit 40. It has been determined that the representative workpiece voltage from threshold circuit 60 should be greater than about 160 mA. In prior art plasma systems, this threshold current level is normally at a preselected current of 2 to 3 amperes. Consequently, switch 44 is normally closed until the workpiece 30 is extremely close to the nozzle 24. For this setting of threshold circuit 60, a pilot arc current of 25 amperes provides a standoff distance of approximately ¼ inch. This is generally illustrated in the transfer distance graph shown in FIG. 5. When this threshold circuit 60 is set to approximately 2 amperes, the standoff or transfer distance is increased toward ⅓ inch. With a preselected current setting for the standoff of 2.0 amperes, the lower pilot current of 15 amperes still provides a standoff of approximately ¼ inch. At a setting of 2.0 amperes, the pilot arc current of 10 amperes will never cause an arc transfer at ¼ inch standoff in the preferred embodiment illustrated in FIG. 1. These transfer distance values are well known parameters in the operation of a plasma arc torch circuit as illustrated in FIG. 1.

Power source 10 has a regulated output current controlled by error amplifier 100 with an output voltage signal on line 102, which signal controls the pulse width modulated current regulator input 16 of the power supply or power source. In accordance with standard current regulations of a plasma system, the actual current is sensed by a shunt 110 with the voltage on line 112 being representative of the magnitude of the actual current $I_R$, which current is the first input signal or actual current level signal to error amplifier 100. The second input to this amplifier is the voltage on line 120 having a value representative of the desired current at any given time for circuit A. A solid state selector switch 130 can change the set point by a movable contact 132, which contact is toggled by the logic on switch line 134. Switch 130 shifts between a cut set point voltage source 140 creating a voltage on terminal 142 and a pilot set point voltage source 150 creating a set point voltage on terminal 152. The voltage on terminal 142 is indicative of the desired cut current of torch 20 which is indicated to be 50 amperes. Voltage at terminal 152 is the voltage representative of the desired pilot arc current $I_p$ in first circuit branch 40 and is illustrated as being a voltage representative of 25 amperes of desired current from power source 10. Main inductor 160 completes the circuit A for driving plasma system or torch 20 by the DC current power source 10 as shown in FIG. 1.

Figure 2:
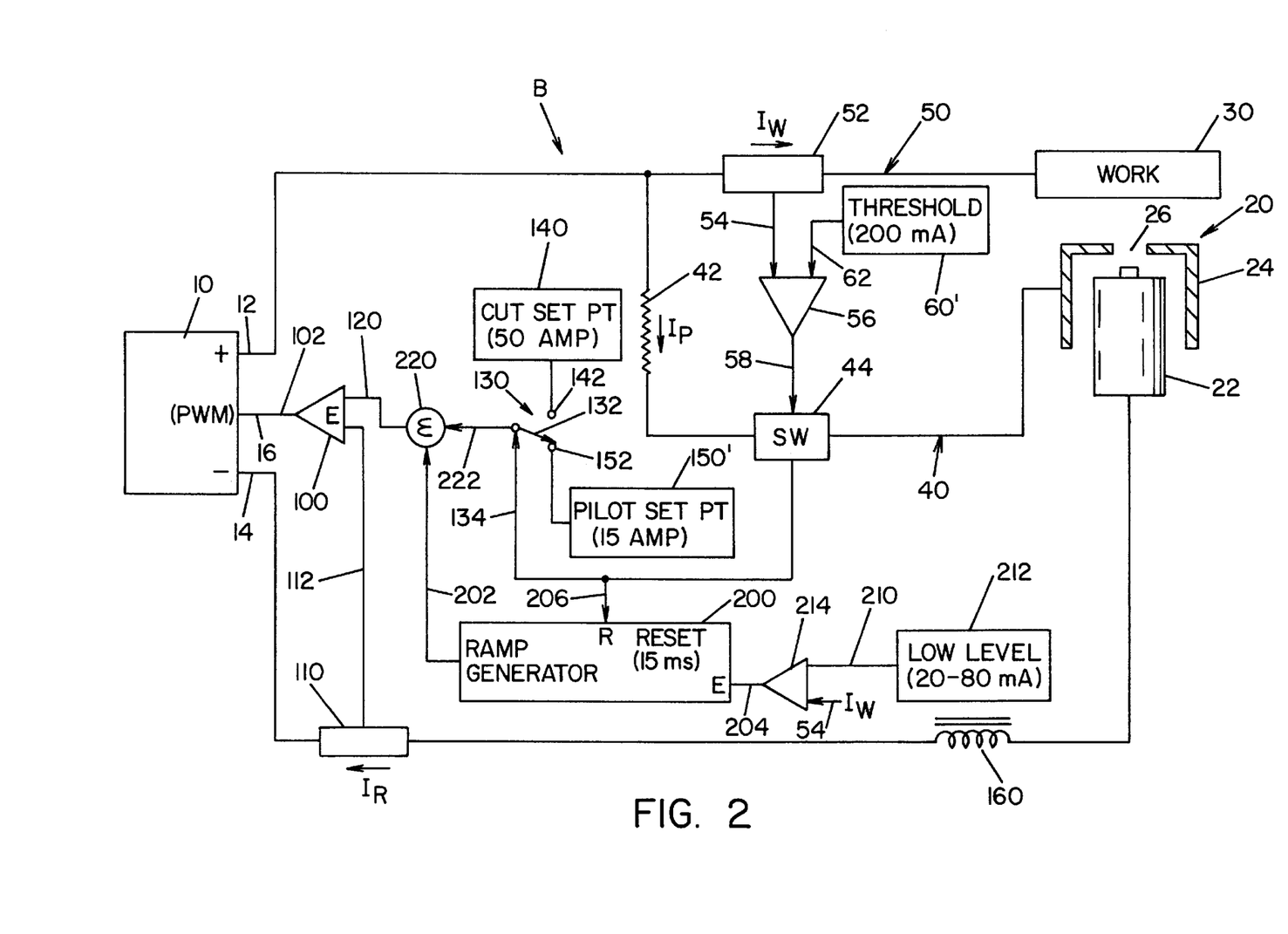
FIG. 2 is a schematic diagram similar to FIG. 1 illustrating the preferred embodiment of the present invention.

The numbers on the elements and components shown in FIG. 1 are used for the same elements or components of system B shown in FIG. 2, which system B is the preferred embodiment of the present invention. The threshold circuit 60' is set to an output voltage in line 62 representative of a workpiece current of 200 mA and the pilot set point 150' is adjusted to a voltage on terminal 152 representative of a pilot arc current $I_p$ of 15 amperes instead of 25 amperes in the prior art circuit A. With these minor exceptions, the circuitry components of circuit B, as illustrated in FIG. 2, have the same numbers as shown in the prior art circuit A. In accordance with the present invention, the prior art is modified or improved by including a wave shape circuit 200 in the form of a standard voltage ramp generator having a ramp voltage output on line 202 and enable terminal E controlled by the logic on line 204. When the logic on line 204 toggles to a logic 1, ramp generator 200 is enabled to output a ramp voltage on line 202. An external reset terminal R is controlled by the logic on line 206 which logic is toggled to the reset state when switch line 134 toggles selector switch 130 when circuit 40 is opened by the logic on line 58. Thus, irrespective of the stage of ramp generator 200, it will be reset to the low level on line 202 when switch 44 is opened and selector switch 130 is shifted to the set cut current terminal 142. The logic on enable line 204 is controlled by the voltage on line 54 which is representative of the workpiece current $I_W$, as previously explained. The voltage on line 210 is controlled by the low level set point circuit 212 to be set at a voltage representative of a relatively low current level, which in practice is less than 100 mA and preferably between 20–80 mA. The voltage on lines 54 and 210 are the inputs to comparator 214 so that the logic on line 204 shifts when the workpiece current represented by the voltage on line 54 exceeds the set voltage on line 210. This initiates the ramp voltage in output line 202 forming the first input to summing injunction 220. The other input is line 222 directing the voltage of selector switch 130 to summing injunction 220. The output of the summing junction is the addition of the voltage on line 222 and the increasing voltage on line 202 to increase the voltage in line 120, which line is the second voltage signal to current regulator or error amplifier 100.

Figure 3:
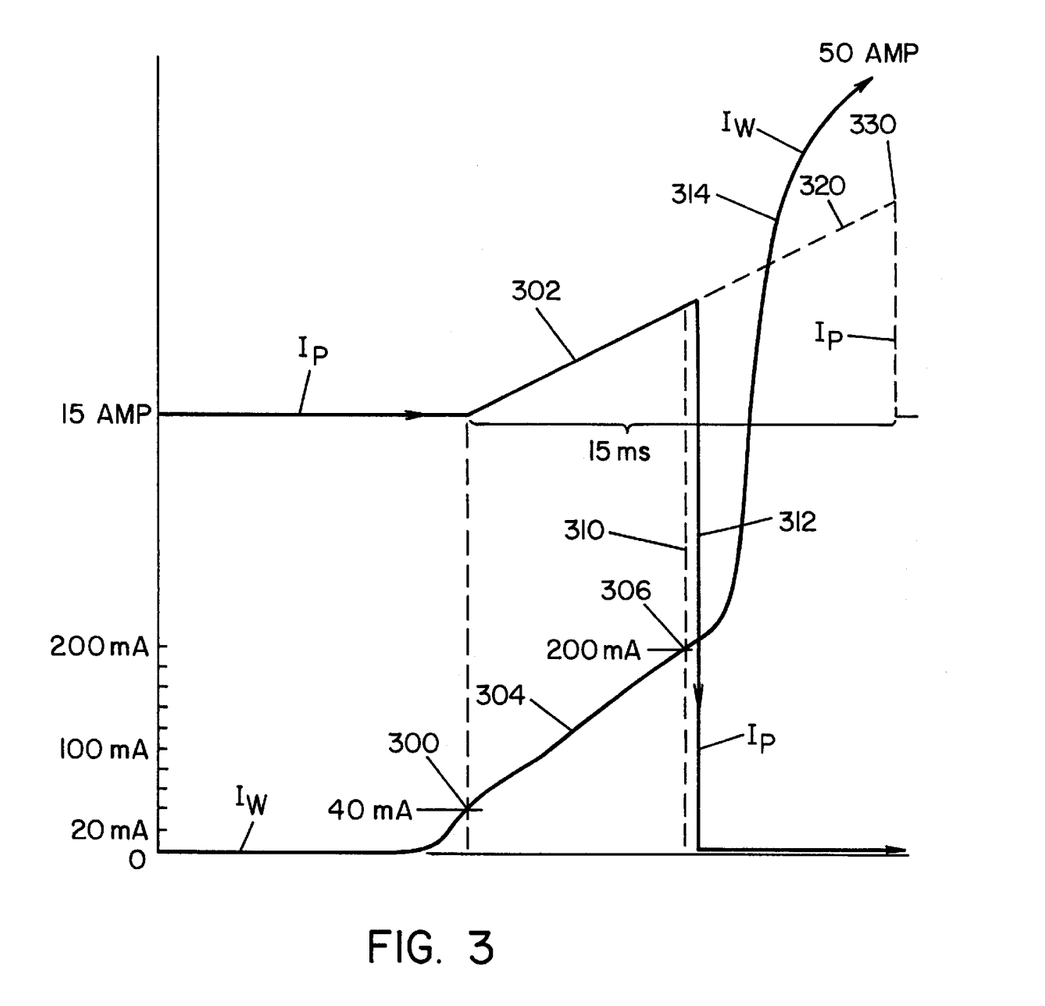
FIG. 3 is a current graph illustrating the operating characteristics of the preferred embodiment of the present invention shown in FIG. 2 with the pilot arc desired current being illustrated in one scale and the workpiece current being illustrated on the same timeline but at a different scale.

In operation, the pilot arc current is controlled by the pilot set point voltage supply 150' which is 15 amperes. Thus, a relatively low pilot arc current $I_p$ flows in first circuit branch 40. As workpiece 30 moves closer to torch 20, current sensing device 52 senses a current to apply a corresponding voltage on line 54. When this current representative voltage reaches the low level threshold voltage on line 210, comparator 214 causes a shift in logic on line 204. Ramp generator 200 is then enabled and a ramp voltage is created on line 202. This increasing voltage is added to the set point voltage increase 222 by summing injunction 220. This increased voltage causes an increase in the voltage of the second signal or the desired current signal appearing on line 120. Thus, current regulator 100 ramps up the current supplied to circuit B, which increased current causes an increase in the pilot arc current $I_p$ toward 25 amperes. This increase in the pilot arc current causes a corresponding increase in the workpiece current $I_w$ to rapidly initiate arc transfer from the pilot arc to the operating plasma arc. This transfer is accomplished at the threshold level of 200 mA set in threshold current circuit 60', shown in FIG. 2. The operating characteristics of the preferred embodiment illustrated in FIG. 2 are set forth in the current graph shown in FIG. 3 where the pilot current $I_p$ is set at 15 amperes and is illustrated in a larger scale than the work current $I_w$. Ramp generator 200 is started at 40 mA. The intersection of the $I_w$ curve and the threshold in line 210 is point 300. When that intersection occurs, the pilot current ramps along line 302 until the work current $I_w$ signal in line 54 reaches the voltage in line 62. This voltage is set at a threshold value representing 200 mA which occurs at point 306 represented on vertical line 310. Comparator 56 then opens switch 44 to stop the pilot current which current descends along line 312 to a zero current value. When that occurs, the logic on line 206 resets ramp generator 200 to discontinue the increasing voltage in line 202. The work current continues along line 314 toward the 50 amperes represented by the voltage on terminal 142 of selector switch 130. This voltage is applied as the second signal on line 120 for controlling the output current of power source 10. In practice, ramp generator 200 is set to ramp up to a voltage level indicative or representative of 25 amperes in 15 ms, as shown in the dashed line 320. If there is no shift in the logic on line 58 and, thus, line 206, the ramp generator resets at point 330 and awaits the next premonition of an arc transfer.

Figure 4:
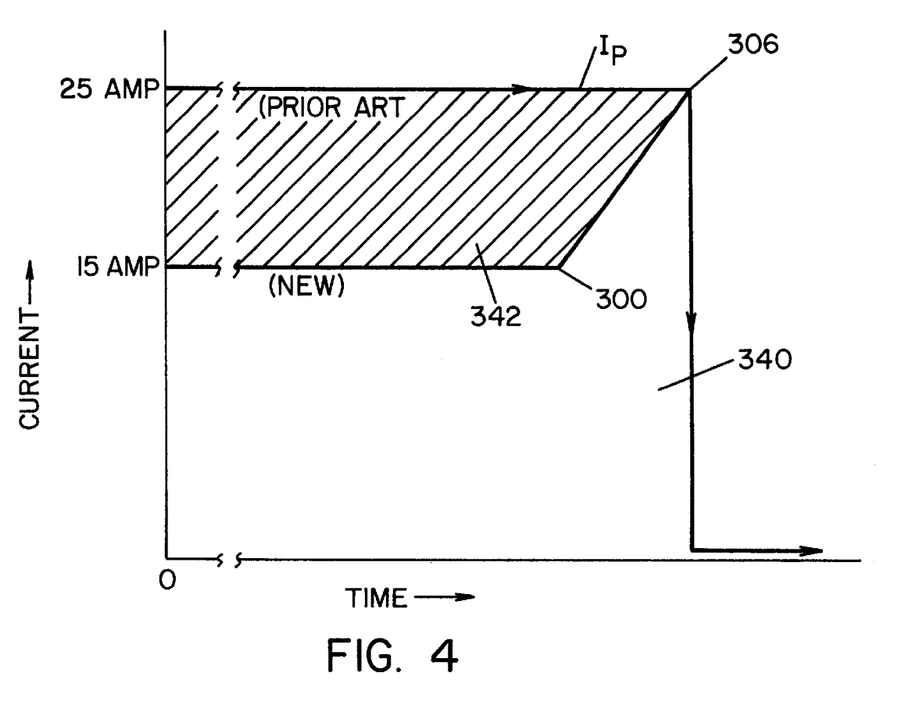
FIG. 4 is a current curve showing the pilot arc current in the prior art circuit shown in FIG. 1 and in the preferred embodiments of the invention illustrated in FIG. 2 with a shaded area indicative of the energy savings by using the present invention.
Figure 5:
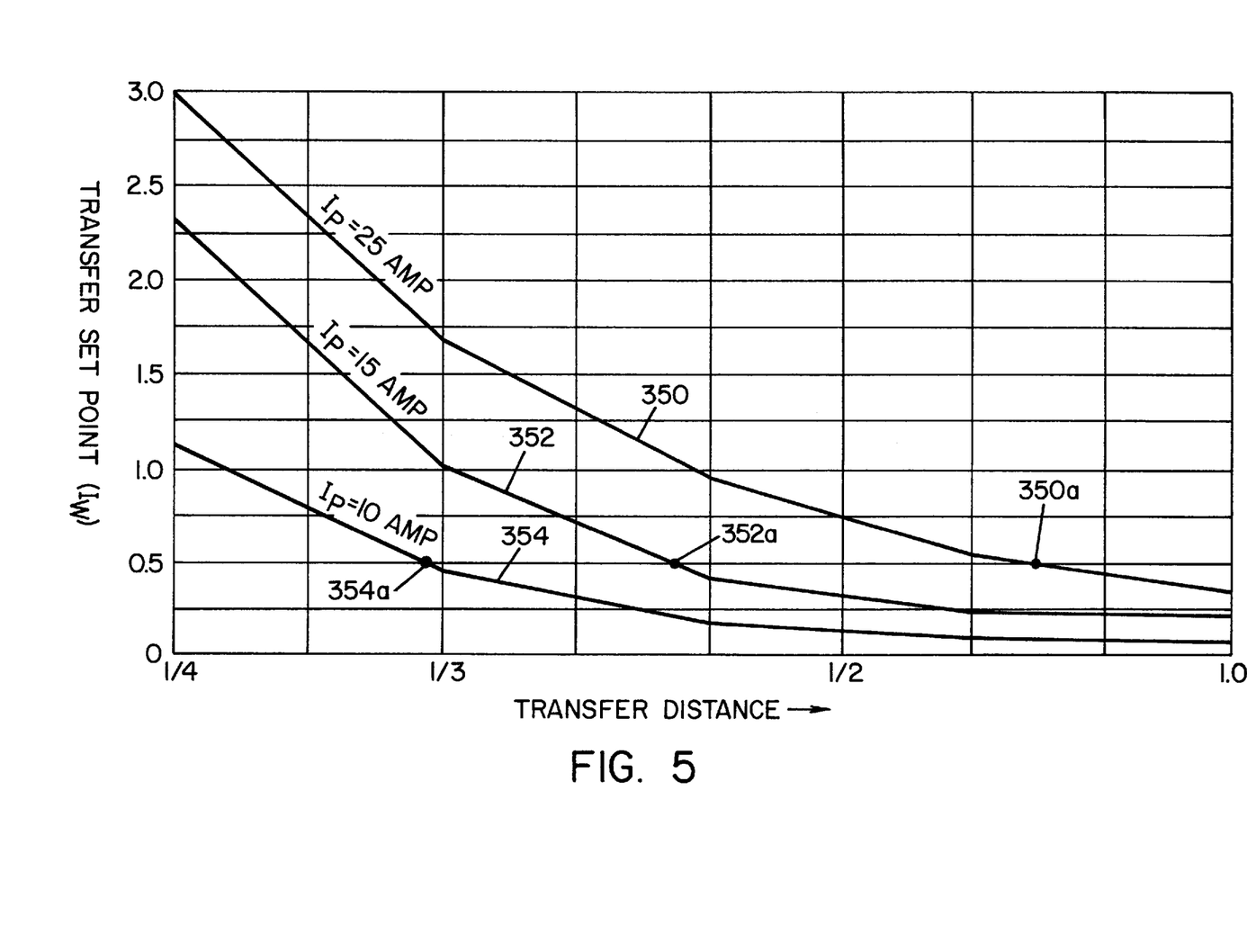
FIG. 5 is a transfer distance or standoff graph for the plasma arc system which graph is used to discuss the advantages of the present invention.

As illustrated in FIG. 4, the present invention reduces the energy required in operating plasma system or torch 20. The energy expended in the prior art is the rectangular area 340 defined by the 25 amperes horizontal line and the vertical line of the pilot arc current as this current shifts to zero during the cutting mode. Shaded area 342 is the energy savings of the present invention wherein the pilot arc current is maintained at 15 amperes until point 300 when the current is ramped toward 25 amperes. There is a continuous energy savings between time zero, the start of the pilot arc, and the transfer at point 306. FIG. 5 is a standard transfer distance graph using representative values. In this graph, line 350 is the transfer distance line for a pilot arc created at 25 amperes. Line 352 is a similar line for operation at 15 amperes and line 354 is a similar line operated at 10 amperes. As can be seen, the higher the pilot current, the larger the transfer distance for a given threshold setting of circuit 60 in FIG. 1 or circuit 60' in FIG. 2. The points 350a, 352a and 354a are representative of the standoff distances if circuit 60' is set to 500 mA. When ramp generator 200 increases the voltage on line 120 after workpiece current in line 54 exceed the set low level in line 210, the standoff distance shifts from point 352a to point 350a as the pilot current increases. This is a substantial increase of the standoff distance obtainable by use of the present invention.

Figure 6A:
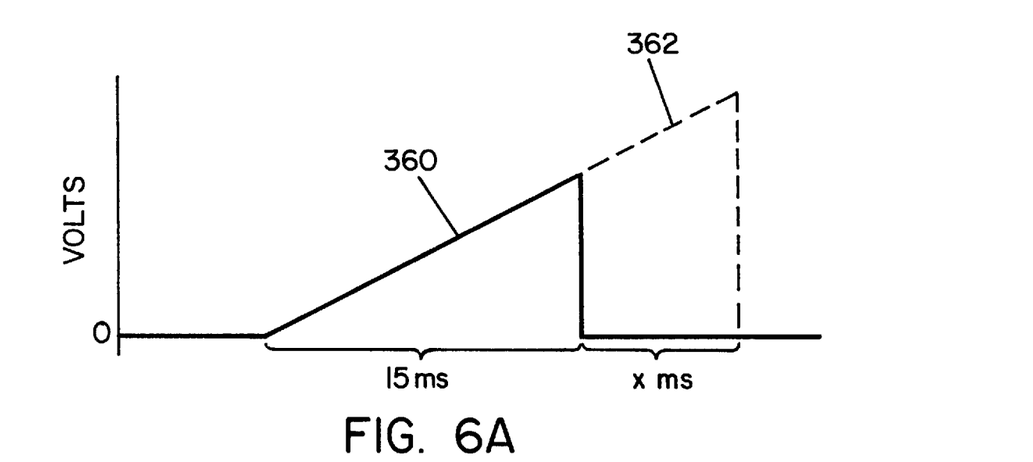
FIG. 6A is a voltage curve showing the preferred selected profile of the output signal of the wave shaped circuit shown in FIG. 2; and, FIG. 6B is a voltage curve illustrating alternative selected profiles for the output of the wave shaped circuit shown in FIG. 2.
Figure 6B:
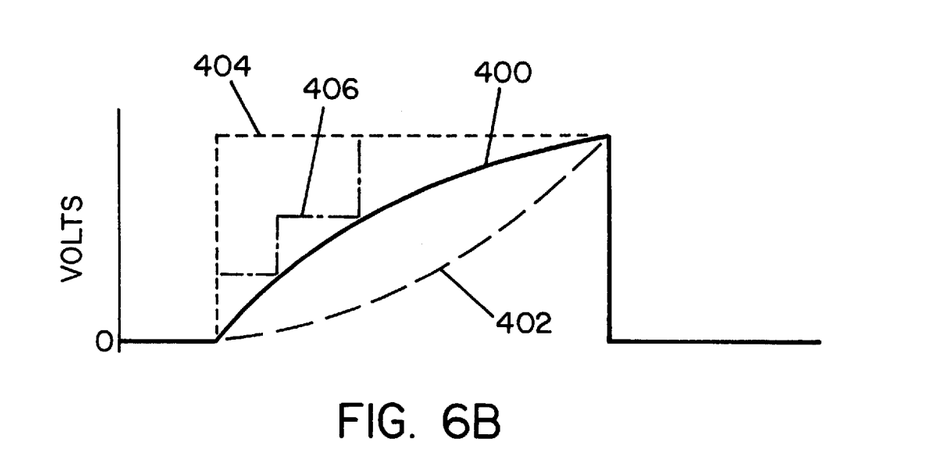

As previously discussed, wave shape circuit 200 can provide various selected profiles increasing the plasma arc current in accordance with many different wave shapes. These shapes are schematically illustrated in FIGS. 6A and 6B. In the preferred embodiment, the wave shape circuit is a ramp generator which creates a voltage ramp 360 shown in FIG. 6A. This ramp is reset, in the preferred embodiment, at 15 ms. Of course, the reset could be adjusted to add additional time x to provide a longer ramp 362 shown in dashed lines in FIG. 6A. Returning now to FIG. 6B, this voltage graph is employed to show that a variety of wave shapes could be used for practicing the present invention. The solid line 400 is a convex curve. Dashed line 402 is a concave curve. In addition, an immediate step up voltage could be obtained as shown in curve 404 or a series of steps could be used as shown in curve 406. Other wave shapes can be used to increase the desired current for the pilot arc circuit branch 40 when the threshold value on line 210 is exceeded by the voltage on line 54.

Having thus defined the invention, the following is claimed:

1. In a circuit for providing D.C. current from a power source having a current regulating input to a plasma system including an electrode and a nozzle with a plasma arc opening exposing said electrode to a juxtapositioned workpiece, said circuit having a first circuit branch for creating a pilot arc across said electrode and nozzle, a second circuit branch for creating an operative plasma arc across said electrode and said workpiece, a current sensor means in said second circuit branch for sensing the workpiece current in said second circuit branch, switch means for opening said first circuit branch when said sensed workpiece current exceeds a preselected current to transfer the pilot arc to the operative plasma arc, and means for regulating the current in said first circuit branch until said arc transfer, said current regulating means including sensing means for creating a first signal having a level representative of the actual current supplied from said power source to said first circuit branch, means for providing a second signal having a level representative of the desired current in said first circuit branch, means for comparing said first and second signals to provide an input signal to said current regulating input of said power source to regulate said actual current to said desired current, the improvement comprising: means for creating a trip signal when said sensed workpiece current exceeds a low level threshold current substantially less than said preselected current, a wave shape circuit for generating a time base signal with an increasing level of a selected profile in response to said trip signal and means for adding said time based signal to said second signal for increasing the level of said second signal by said selected profile to correspondingly increase said actual current supplied from said power source to said first circuit branch.

2. The improvement as defined in claim 1 wherein said selected profile is a ramp.

3. The improvement as defined in claim 2 wherein said ramp is a straight line ramp.

4. The improvement as defined in claim 2 wherein said ramp is comprised of several steps.

5. The improvement as defined in claim 1 wherein said selected profile is a generally concave curve.

6. The improvement as defined in claim 1 wherein said selected profile is a generally convex curve.

7. The improvement as defined in claim 1 wherein said selected profile is a time constant curve.

8. The improvement as defined in claim 1 wherein said selected profile is a step function.

9. The improvement as defined in claim 1 wherein said preselected current is in the range of 150 mA to 3 amperes.

10. The improvement as defined in claim 1 wherein said preselected current is greater than about 150 mA.

11. The improvement as defined in claim 1 wherein said low level threshold current is substantially less than 100 mA.

12. The improvement as defined in claim 1 wherein said low level threshold current is in the range of 20–80 mA.

13. The improvement as defined in claim 1 including means for resetting said wave shape circuit in response to said arc transfer.

14. The improvement as defined in claim 13 including means in said wave shape circuit for resetting said wave shape circuit after a preselected time interval following said trip signal absent an arc transfer during said time interval.

15. A method for providing D.C. current from a power source having a current regulating input to a plasma system including an electrode and a nozzle with a plasma arc opening exposing said electrode to a juxtapositioned workpiece, said circuit having a first circuit branch for creating a pilot arc across said electrode and nozzle, a second circuit branch for creating an operative plasma arc across said electrode and said workpiece, said method comprising the steps of:

(a) sensing the workpiece current in said second circuit branch;

(b) opening said first circuit branch when said sensed workpiece current exceeds a preselected current to transfer the pilot arc to the operative plasma arc:

(c) regulating the current in said first circuit branch until said arc transfer;

(d) said current regulating step including the steps of:

(e) creating a first signal having a level representative of the actual current supplied from said power source to said first circuit branch;

(f) providing a second signal having a level representative of the desired current in said first circuit branch;

(g) comparing said first and second signals to provide an input signal to said current regulating input of said power source to regulate said actual current in said first circuit branch to said desired current;

(h) creating a trip signal at the time when said sensed workpiece current exceeds a low level threshold current substantially less than said preselected current;

(i) generating a time based signal with an increasing level of a selected profile in response to said trip signal; and, (j) adding said time based signal to said second signal for increasing the level of said second signal by said selected profile to correspondingly increase said actual current supplied from said power supply to said first circuit branch.

16. The method defined in claim 15, wherein said preselected current is in the range of 150 mA to 3 amperes.

17. The method defined in claim 15, wherein said preselected current is greater than about 150 mA.

18. The method as defined in claim 15, wherein said low level threshold current is substantially less than 100 mA.

19. The method as defined in claim 15, wherein said low level threshold current is in the range of 20–80 mA.

20. The method as defined in claim 15, including the additional steps of:

(k) resetting said wave shape circuit in response to said arc transfer.

21. The method as defined in claim 20, including the additional step of:

(i) resetting said wave shape circuit after a preselected time interval following said trip time absent an arc transfer during said time interval.

22. The method as defined in claim 15, including the additional step of:

(k) resetting said wave shape circuit after a preselected time interval following said trip signal absent an arc transfer during said time interval.

23. In a circuit for providing D.C. current from a power source having a current regulating input to a plasma system including an electrode and a nozzle with a plasma arc opening exposing said electrode to a juxtapositioned workpiece, said circuit having a first circuit branch for creating a pilot arc across said electrode and nozzle, a second circuit branch for creating an operative plasma arc across said electrode and said workpiece, a current sensor means in said second circuit branch for sensing the workpiece current in said second circuit branch, switch means for opening said first circuit branch when said sensed workpiece current exceeds a preselected current to transfer the pilot arc to the operative plasma arc, and means for regulating the current in said first circuit branch until said arc transfer, said current regulating means including sensing means for creating a first signal having a level representative of the actual current supplied from said power source to said first circuit branch, means for providing a second signal having a level representative of the desired current in said first circuit branch, means for comparing said first and second signals to provide an input signal to said current regulating input of said power source to regulate said actual current to said desired current, the improvement comprising: said second signal having a set level, means for creating a transfer signal when said sensed workpiece current exceeds a low level threshold current substantially less than said preselected current and circuit means responsive to said transfer signal for increasing the level of said second signal above said set level to correspondingly increase said actual current supplied from said power source to said first circuit branch.

24. The improvement as defined in claim 23, wherein said preselected current is in the range of 150 mA to 3 amperes.

25. The improvement as defined in claim 23, wherein said low level threshold current is substantially less than 100 mA.

26. The improvement as defined in claim 23, including means for shifting said second signal from said increased level to said second set level in response to said arc transfer.

27. The improvement as defined in claim 23, including means in said circuit means for shifting said second signal from said increased level to said set level after a preselected time interval following said transfer signal absent an arc transfer during said time interval.

* * * * *